(No Model.)
F. THOMPSON.
NUT LOCK.
No. 579,848. Patented Mar. 30, 1897.
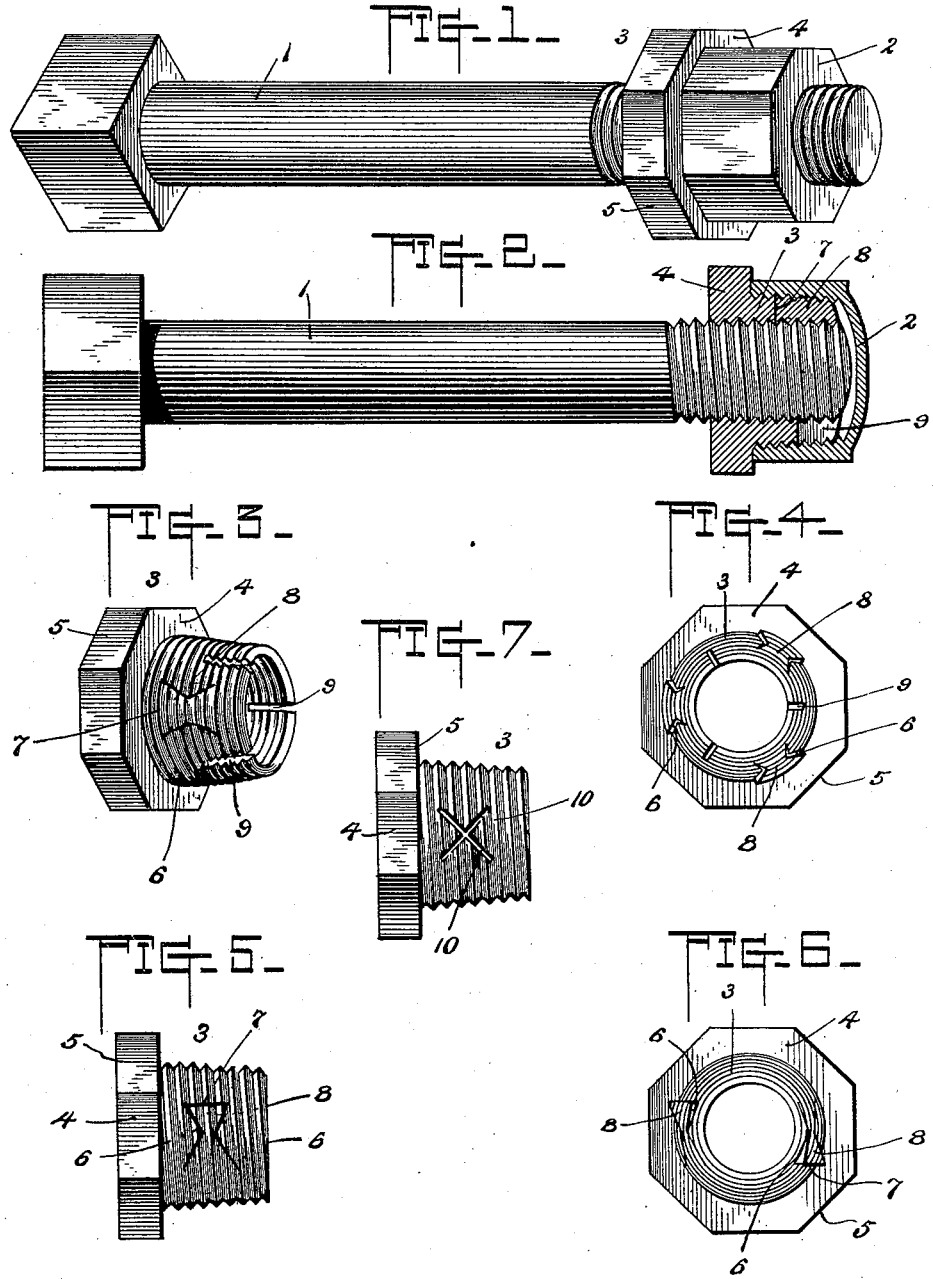
Witnesses
C. E. Hunt
Saml R Turner
Inventor
Franklin Thompson,
By Arthur M. Poynton,
Attorney

UNITED STATES PATENT OFFICE.

FRANKLIN THOMPSON, OF BROOKLYN, NEW YORK.

NUT-LOCK.

SPECIFICATION forming part of Letters Patent No. 579,848, dated March 30, 1897.

Application filed December 22, 1896. Serial No. 616,598. (No model.)

*To all whom it may concern:*

Be it known that I, FRANKLIN THOMPSON, a citizen of the United States, residing at Brooklyn, in the county of Kings and State of New York, have invented certain new and useful Improvements in Nut-Locks; and I do hereby declare the following to be a full, clear, and exact description of the invention, such as will enable others skilled in the art to which it appertains to make and use the same.

My invention relates to nut-locks, being designed to prevent a nut from working loose on the bolt or other threaded object upon which the nut is placed.

The object of the present invention is to provide means for retaining a nut in place without altering the bolt upon which the nut is fitted or without having to manufacture a special form of bolt, the nut being thus applicable to any bolt.

My invention consists in an improved nut-lock embodying certain novel features and details of construction hereinafter particularly set forth, shown in the drawings, and incorporated in the claims.

In the accompanying drawings, Figure 1 is a perspective view of a bolt and nut, showing the improved lock applied thereto. Fig. 2 is a side elevation of a bolt, showing the nut and locking device in section. Fig. 3 is a detail perspective view of the locking device. Fig. 4 is a front elevation of the same. Fig. 5 is a plan view of the locking device, showing a different disposition of the tongue. Fig. 6 is a front elevation of the same. Fig. 7 is a plan view of the locking device, showing a modified form of tongue.

Similar numerals of reference designate corresponding parts in the several figures of the drawings.

For the purpose of illustrating the invention I have shown the nut-lock as applied to an ordinary threaded bolt 1, the nut being indicated at 2 and the locking device at 3.

The locking device is in the form of a sleeve internally threaded to screw upon the bolt and provided at its inner end with a circumferential flange 4, having wrench-engaging surfaces 5, whereby it may be screwed in or out by a wrench.

The outer surface of the locking device is substantially cylindrical and preferably made slightly tapering, being somewhat less in diameter at its outer end to receive the internally-threaded nut 2, which may be correspondingly tapered as to its threaded bore. V-shaped incisions 6 are made through the sleeve portion of the locking device, the said incisions being spaced apart and joined at their inner ends by a cross-incision 7, thus forming a tongue 8, bounded by a substantially U-shaped incision. This tongue gradually increases in thickness from its base to its free edge, so that said edge normally projects beyond the outer surface of the sleeve, and when forced inward by the nut binds firmly against the bolt and also within the nut. The outer surface of the tongue also presents an inclined surface upon which the nut acts for forcing the tongue inward. One, two, or more of these tongues may be provided, according to the required amount of resistance desired to the backing off of the nut.

In addition to the tongues 8 the sleeve of the locking device may be provided with longitudinal slits 9, cut from the outer edge of the sleeve inward to allow the sleeve to be contracted upon the bolt as the nut is screwed inward, although ordinarily the resilient tongues 8 will be sufficient. If desired, the tongues 8 may be disposed transversely or circumferentially of the sleeve, as shown in Figs. 5 and 6, instead of longitudinally, as shown in Figs. 2, 3, and 4.

Instead of forming the tongues as heretofore described cross-incisions 10 may be made through the sleeve, the said incisions intersecting each other at intermediate points, as shown, and forming a plurality of tongues adapted to engage with the bolt and nut.

The nut-lock above described is simple and inexpensive and does away with the necessity of using washers to prevent the nut from working loose and also dispenses with the use of an extra or jam nut. It is to be understood that the form of the tongue may be varied, and that other changes in the form, proportion, and minor details of construction may be resorted to without departing from the spirit or sacrificing any of the advantages of this invention.

Having thus described the invention, what is claimed as new, and desired to be secured by Letters Patent, is—

1. In a nut-lock, a locking device consisting of a sleeve adapted to fit between a nut and the object to which the nut is applied, said sleeve being provided with a resilient tongue formed by a substantially U-shaped incision extending through the side of the sleeve, substantially as described.

2. In a nut-lock, a locking device consisting of a sleeve adapted to fit between the nut and the object to which the nut is applied, said sleeve having a resilient tongue thicker than the body of the sleeve said tongue being included within the plane of and surrounded by the body of the sleeve, substantially as described.

3. In a nut-lock, a locking device consisting of a sleeve adapted to fit between a nut and the object to which the nut is applied, said sleeve having a resilient tongue increasing in thickness toward its free end and terminating short of the end of the sleeve, substantially as described.

4. In a nut-lock, a locking device in the form of an internally and externally threaded sleeve provided with one or more resilient tongues, each formed by incisions extending through the side of the sleeve and spaced apart and connected at their extremities by a cross-incision, substantially as described.

5. In a nut-lock, a locking device in the form of a sleeve provided at one end with a circumferential wrench-engaging flange and having a tapering outer surface which is threaded, said sleeve also having a resilient tongue which is entirely inclosed, substantially as described.

6. In a nut-lock, a locking device in the form of a sleeve, internally and externally threaded and provided with an inclosed tongue the free end of which is thicker than the body of the sleeve, substantially as described.

In testimony whereof I affix my signature in presence of two witnesses.

FRANKLIN THOMPSON.

Witnesses:
E. R. MERRILL,
JAMES R. ROSS.